Nov. 15, 1966  C. W. MILEY  3,286,264
ANTENNA TEST SHIELD
Filed April 7, 1964
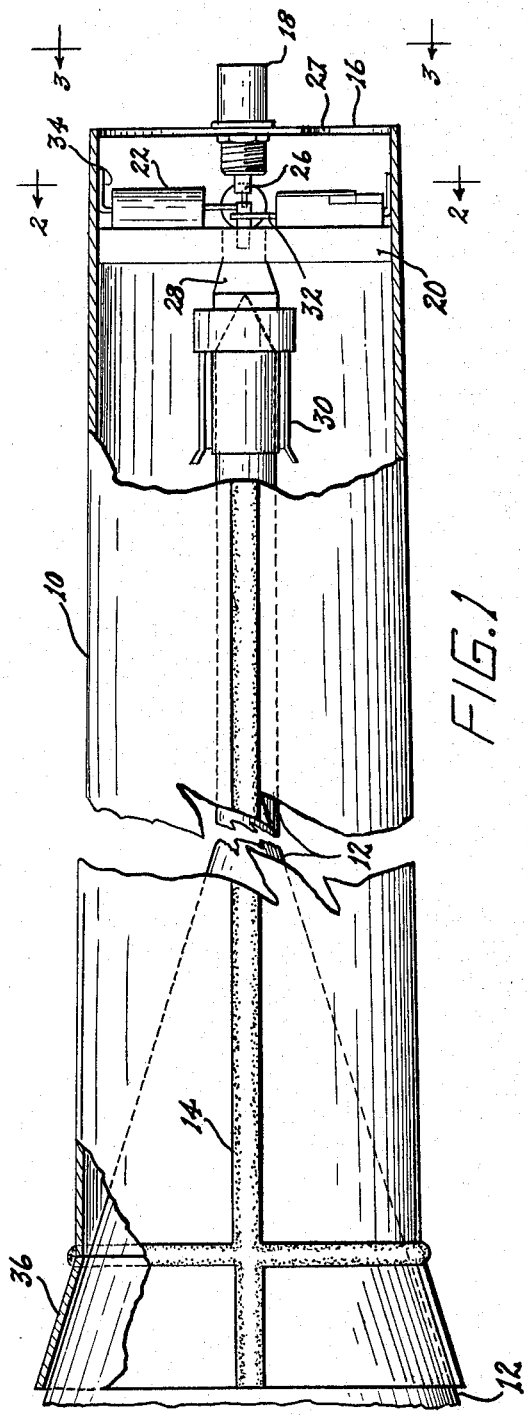
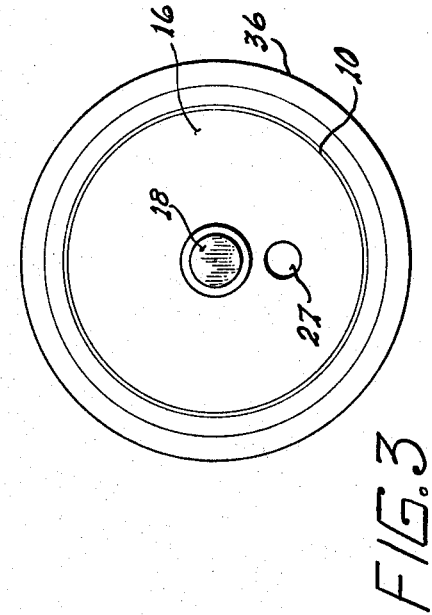
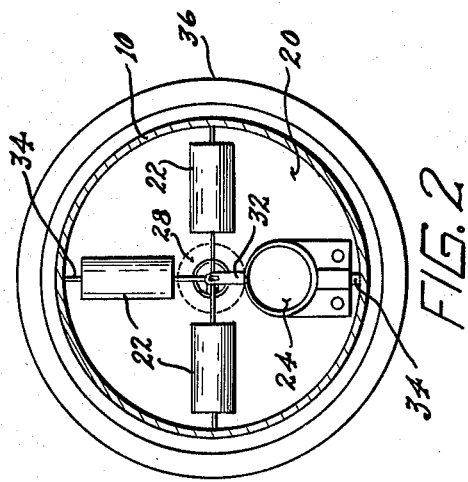
INVENTOR.
CALVIN W. MILEY
BY
ATTORNEYS

United States Patent Office 3,286,264
Patented Nov. 15, 1966

3,286,264
ANTENNA TEST SHIELD
Calvin W. Miley, Fort Walton Beach, Fla., assignor to the United States of America as represented by the Secretary of the Air Force
Filed Apr. 7, 1964, Ser. No. 358,128
1 Claim. (Cl. 343—703)

The invention described herein may be manufactured and used by or for the United States Government for governmental purposes without payment to me of any royalty thereon.

This invention relates to a method and equipment for monitoring power output of the telemetry transmission system on space probe vehicles, and providing a shield or absorber housing for radiating antennas to confine the radiated energy within the housing cap and preventing them from radiating into free space, while at the same time simulating free space conditions.

When an antenna-transmitter system is installed (for example, a counter-measure jamming system aboard an aircraft), it is mandatory that it be checked out from time to time to assure proper operation. During the check-out, it is desirable that radio silence be maintained, to comply with imposed requirements or to eliminate interference with other electronic equipment. In addition, the check-out should be undertaken under conditions which simulate normal operation, i.e., the antenna should radiate under free space conditions.

When such testing has been done in the past, various means have been tried to prevent disruption and interference with other missions using the same frequency. Many devices have been tried for absorbing energy radiated during such testing. These have been attended for the most part with hazards, failures, and erratic, inconsistent and generally undependable results. Allowance for obtaining the best possible result involving a broad band of discrete frequencies is generally absent. The shields thus far proposed have been vulnerable to wind forces, because of the size of the apparatus used. Great difficulties have been experienced in the attachment and support of these large devices.

The object of the present invention is to obviate the above noted difficulties by providing an effective temporary shielding of the radiation from a microwave antenna during testing, adjusting, or measurement of equipment, and one that is small in size, sturdy in construction, and which lends itself to ease of operation. The device of the invention may be, for example, as small as 3 inches in diameter and 15 inches in length.

A further object of the invention is the provision of a shield as above described which has a built-in connector, so that the power may be monitored at any time without the necessity of inserting a separate probe; one where there are no extra connections to be made, and no loose cables inside the absorbing shield that may be the cause of failure or may cause error in readings of the power meter.

A further object of the invention is the elimination of such devices as absorber cloths for absorbing the energy radiated from the antenna.

A further characteristic of the invention is the end loading with lumped constants, including a variable capacitor which allows for peaking to obtain the best possible conditions for successful testing of a broad band of discrete frequencies.

A further object of the invention is the provision of a device which is capable of being press fitted over the telemetry nose stub antenna and precludes any necessity for external mounting supports or tie down arrangements. It also allows for a greater degree of confidence in reading of the output power levels since the device is attached each time in exactly the same position.

A further advantage of the invention is its adaptability to modification to meet special requirements of an unusual nature. For example, adaptation for use in conjunction with skin mounted telemetry quadraloop antennas.

A further advantage of the device of the invention is its resistance to wear and environmental degradation. It is ruggedly built and capable of extensive use in the laboratory, or in the field with no danger or damage or susceptibility to moisture or other environmental conditions.

Another object of this invention involves the provision of an antenna test shield which utilizes conventional, currently available components that lend themselves to standard mass production manufacturing techniques.

These and other advantages, features and objects of the invention will become more apparent from the following description taken in connection with the illustrative embodiment in the accompanying drawings, wherein:

FIGURE 1 is a plan view of the device, with portions broken away to show the interior of the shield;

FIGURE 2 is a cross-section taken on the line 2—2 of FIGURE 1; and

FIGURE 3 is an end view, looking in the direction indicated by the arrows on line 3—3 of FIGURE 1.

Referring more in detail to the drawings, the numeral 10 indicates generally a tapered cylinder which constitutes the main body of the shield and functions as the outer conductor for the monitoring device. Brass has been successfully used as the material for this cylinder. However, any conducting material having the required characteristics may be used. The shield body 10 is fitted over a nose cone stub antenna 12, which acts as the center conductor. The shield cylinder may be formed by welding as shown at 14 or in any other suitable manner.

A cap 16 is secured into the smaller end of the cylinder 10. A connector 18 is attached to the cap 16 and provides means for connecting testing instruments as desired. A disc 20, which may be plastic or other suitable material, is fitted into the tapered cylinder 10 adjacent, but spaced from the cap 16, providing a support for the lumped constants unit. This unit comprises the resistors 22, and a variable capacitor 24. Three resistors and one capacitor are shown for exemplification purposes. Design variations may require changes which nevertheless fall within the scope of the invention, as defined in the claim. An opening 27 in the cap 16 provides access to the capacitor 24 for adjusting and replacement purposes.

A connector 28 of standard or other type is secured into the disc 20 and is formed to fit snugly over the nose cone stub antenna 12. Leaf springs 30 may be employed for secure fitting. Conducting elements 32 provide continuity between the connector 28 and the elements 22 and 24 of the lumped unit. Conducting elements 34 connect the resistors and the capacitor to the shield 10. The resistors, as is well understood, absorb and convert the microwave energy. The function of the adjustable capacitor is to make the device operable at selectable specific wavelengths over a broad band.

At the opposite end of the cylinder 10, a flange 36 is welded or otherwise attached to the cylinder 10. The flange 36 is flared to the pitch of the nose cone itself and fits firmly on the nose cone skin providing both electrical continuity to ground and mechanical stability.

When the device is fitted firmly with secure contact between the antenna tip and the contact and supporting element 28, and the flange 36 is fitted firmly over the nose cone skin, there is adequate mechanical support; there is adequate absorption of the microwave energy emanating from the antenna; and there is adequate grounding of the unconverted energy. At the same time, the whole operating environment simulates free space.

Although the invention has been described with reference to a particular embodiment, it will be understood to those skilled in the art that the invention is capable of a variety of alternative embodiments within the spirit and scope of the appended claim.

What is claimed is:

A mechanically self-supporting cap shield for absorbing and confining energy radiated from a rod antenna and terminating said antenna in free space conditions, said cap shield comprising a cylindrical body, a flared conical flange on one end of said body, said flange being flared to the pitch of a nose cone to fit firmly thereon and to provide mechanical stability and electrical grounding, a supporting disk attached to the interior of said cylindrical body adjacent its other end, resilient means attached to a surface of said disk for fitting firmly over the tip of the antenna, a lumped constant unit comprising resistors and a capacitor mounted on said supporting disk, electrical connection between said antenna and each element of said lumped constant unit, conductive connection between said unit and said cap shield, the electrical characteristics of said cap shield and said lumped constants simulating free space conditions.

References Cited by the Examiner

UNITED STATES PATENTS

| | | | |
|---|---|---|---|
| 2,516,060 | 7/1950 | Levenson | 343—703 X |
| 2,565,900 | 8/1951 | Wiley | 333—22 |
| 2,839,730 | 6/1958 | Rosenberg | 333—22 |
| 2,988,740 | 6/1961 | Albanese | 343—703 |
| 3,029,430 | 4/1962 | Jones | 343—703 |

ELI LIEBERMAN, *Primary Examiner.*

HERMAN KARL SAALBACH, *Examiner.*

R. F. HUNT, *Assistant Examiner.*